United States Patent [19]

Cunniff et al.

[11] Patent Number: 4,600,814

[45] Date of Patent: Jul. 15, 1986

[54] AUTOMATED SYSTEM FOR ESTABLISHING TELEPHONE VOICE CONNECTIONS

[75] Inventors: William B. Cunniff, Glen Head; Walter Tyler, Glen Cove, both of N.Y.

[73] Assignee: Manufacturing Administrations Management Systems, Inc., Amityville, N.Y.

[21] Appl. No.: 538,770

[22] Filed: Oct. 5, 1983

[51] Int. Cl.⁴ .................. H04M 3/46; H04M 3/56
[52] U.S. Cl. .............. 179/18 BC; 179/18 BA; 179/90 BD
[58] Field of Search ........... 179/6.02, 18 BC, 2 AS, 179/2 AM, 18 B, 18 BA, 18 AD, 90 BD, 90 BB, 90 B, 5 R, 5 P; 370/62

[56] References Cited

U.S. PATENT DOCUMENTS

| | | | |
|---|---|---|---|
| Re. 30,903 | 4/1982 | Vicari et al. | 179/27 FH |
| 3,697,672 | 10/1972 | Reisch | 178/3 |
| 3,733,430 | 5/1973 | Thompson et al. | 358/84 |
| 3,733,440 | 5/1973 | Sipes | 179/18 B |
| 3,809,810 | 5/1974 | Walker et al. | 381/81 |
| 3,818,455 | 6/1974 | Brenski et al. | 364/200 |
| 3,835,260 | 9/1974 | Prescher et al. | 179/18 ES |
| 3,868,640 | 2/1975 | Binnie et al. | 179/2 AM |
| 3,912,874 | 10/1975 | Botterell et al. | 179/18 BC |
| 3,916,112 | 10/1975 | Kalat et al. | 179/18 ES |
| 3,943,289 | 3/1976 | Sheldon et al. | 179/6.02 |
| 3,975,596 | 8/1976 | Pommerening | 179/18 BC |
| 3,987,252 | 10/1976 | Vicari | 179/27 FH |
| 4,086,443 | 4/1978 | Gorham et al. | 179/90 BD |
| 4,105,871 | 8/1978 | Ely et al. | 179/18 AD |
| 4,105,874 | 8/1978 | Ely et al. | 179/18 AD |
| 4,112,258 | 9/1978 | Alles | 370/62 |
| 4,119,803 | 10/1978 | Jacob | 370/58 |
| 4,125,872 | 11/1978 | Maxwell | 364/900 |
| 4,136,263 | 1/1979 | Williams | 179/18 J |
| 4,160,124 | 7/1979 | Law | 179/2 DP |
| 4,160,125 | 7/1979 | Bower et al. | 179/6.02 |
| 4,166,199 | 8/1979 | Gueldenpfennig et al. | 179/27 CA |
| 4,196,316 | 4/1980 | McEowen et al. | 179/18 ES |
| 4,211,895 | 7/1980 | Davis et al. | 179/18 J |
| 4,215,243 | 7/1980 | Maxwell | 179/2 DP |
| 4,215,248 | 7/1980 | Shannon, Jr. | 179/99 A |
| 4,259,549 | 3/1981 | Stehman | 179/18 ES |
| 4,286,118 | 8/1981 | Mehaffey et al. | 179/18 AD |
| 4,287,567 | 9/1981 | Lumsden | 364/900 |
| 4,291,196 | 9/1981 | Spaniol et al. | 178/3 |
| 4,291,199 | 9/1981 | Densmore et al. | 179/18 AB |
| 4,313,036 | 1/1982 | Jabara et al. | 179/18 AD |
| 4,322,581 | 3/1982 | Christian et al. | 179/18 ES |
| 4,334,126 | 6/1982 | Slingsby | 179/18 ES |
| 4,339,633 | 7/1982 | Ahmed | 179/99 M |
| 4,356,348 | 10/1982 | Smith | 179/175.2 R |
| 4,438,296 | 3/1984 | Smith | 179/6.02 |
| 4,468,529 | 8/1984 | Samuel et al. | 179/18 BA |
| 4,481,383 | 11/1984 | Madon | 179/7.1 R |
| 4,509,167 | 4/1985 | Bantel et al. | 370/62 |

FOREIGN PATENT DOCUMENTS 39664 3/1982 Japan .................. 179/18 BC

*Primary Examiner*—Thomas W. Brown
*Attorney, Agent, or Firm*—Lilling & Greenspan

[57] ABSTRACT

A computer inputed with a data base of potential call recipients and having an EIA RS-232 Data Communication Equipment interface drives an auto-call unit or dialer through a format conversion device to be compatible with the dialer EIA RS-366 automatic calling equipment interface. A line signalling device monitors the dial stream for conference connection commands and establishes a voice connection between the computer, an external or remote station and an internal or local extension upon receipt of such command. The computer thereupon disengages itself from the conference connection while maintaining the same between the remote and local stations. While a previously established conference connection may continue to be in progress, the computer is free to process a new sequence of dial digits from the data base to establish a conference connection between a next successive group of handsets in an automated, high speed repetitive manner.

25 Claims, 3 Drawing Figures

AUTOMATED SYSTEM FOR ESTABLISHING TELEPHONE VOICE CONNECTIONS

BACKGROUND OF THE INVENTION

1. Field of the Invention

The invention generally relates to telephone switching systems, and more specifically to an automated system for establishing telephonic communication connections on a high speed repetitive basis.

2. Description of the Prior Art

Well known in the prior art are computer-communications facilitates that integrate computer telecommunication devices which are adapted to establish a telecommunications path for data transfer between two modems on a dial-up basis. See, for example, U.S. Pat. Nos. 3,362,015 and 4,125,872. U.S. Pat. No. 4,125,872 discloses a multi-line automatic calling system adapter which is intended for controlling automatic dialing apparatus to automatically connect a telephone line to a modem for the transfer of data.

Also known are computer peripherals such as the IBM Series/1 Auto-call Originate or Teleprocessing Card (RPQ DO2013), which allows the IBM Series/1 to be automatically connected, via switched telephone lines, to a distant station for the purpose of transmitting data.

However, to date, the use of a computer or data terminal equipment (DTE) to control a telecommunications system including private branch exchanges (PBX's) by means of data communication equipment (DCE) for the purpose of establishing voice connections between successive groups of receivers each having an individual telephone address, on a high speed repetitive basis, has not been broached.

Thus, while automatic connections for data communications have been known and used, systems for establishing telephone voice connections have essentially continued to rely on manual operations and, therefore, have continued to be slow and inefficient. In applications, for example, requiring multiple operators to be connected with a large number of potential telephone call recipients, systems for establishing telephone voice connections have not made efficient use of existing staff, have resulted in tedious manual functions and related errors, have maintained low operator productivity, and have made it difficult for management to be made timely aware of contacts, results and planned follow-up. The lack of an available automated system for establishing telephonic communication connections in performing certain common and important operations, such as collections, fund raising, polls, tele-marketing and the like, has made these undertakings costly, less productive and inefficient.

SUMMARY OF THE INVENTION

It is a primary object of this invention to provide a system which permits an external data generating device, such as a computer or data terminal equipment (DTE), to control a telecommunications switching device for establishing telephonic communication connections for a plurality of successive groups of at least two receivers.

It is another object of the present invention to provide a system for establishing telephonic communication connections as aforementioned which uses a computer or data terminal equipment (DTE), as a call originator, to control a telecommunications switching device for initially making a telephonic communication connection, and subsequently disengaging the computer or data terminal equipment (DTE) from said connection, while maintaining the connection between the other receivers. Said disengagement thereby enabling the computer or DTE to establish another connection between a next successive group of receivers or parties on an automated basis.

It is still another object of the present invention to provide a system for establishing telephonic communication connections between successive groups of receivers, whether remote or local, on a high speed repetitive basis.

It is a further object of the present invention to provide a system for establishing telephone communication connections of the type above-suggested which can be driven by a computer or data terminal equipment (DTE) which has either an interface between data terminal equipment and automatic calling equipment for communications in EIA Standard RS-366 or an interface between data processing terminal equipment and data communication equipment for communications in EIA Standard RS-232.

In order to achieve the above objects, as well as others which will become apparent hereafter, the present invention consists of an automated system for establishing telephonic communication connections between successive groups of receivers each having individual telephone addresses. The system includes telecommunications means for receiving dialing information for dialing the receivers having the telephone addresses within each of said groups. The telecommunications means includes connecting means for connecting at least two of said receivers within each group to each other upon the presentation of connection commands to said telecommunications means. Data generating means is provided having an interface for outputting said dialing information and connection commands to said telecommunications means in predetermined sequences. In this manner, said data generating means controls the dialing and connecting functions of said telecommunications means to thereby provide telephonic connections between successive groups of receivers.

In accordance with the presently preferred embodiment of the invention, the data generating means consists of a computer or data terminal equipment (DTE) programmed to generate specifically formed data in a form acceptable to a line signalling device and a telecommunication dialer. The formated data contains at least two telephone numbers or addresses and unique control characters designed to be interpreted by the various data communications equipment (DCE) components as instructions to perform specific tasks. The combination of telephone numbers or addresses and control characters, when acted upon by the various system components which are connected to a telecommunications switching device, with proper capability, allows a telephone connection between two parties to be established without manual intervention. An important feature of the present invention is the disengagement of the computer or data terminal equipment (DTE) from the conference connection after it has been established, to allow the telecommunications switching device to be reused for further telephone connections with successive groups of receivers.

BRIEF DESCRIPTION OF DRAWINGS

The foregoing and other objects, features and advantages of the invention will be apparent from the following description of the preferred embodiments of the invention, as illustrated in the accompanying drawings.

DESCRIPTION OF THE PREFERRED EMBODIMENTS

Overview

Figure 1:
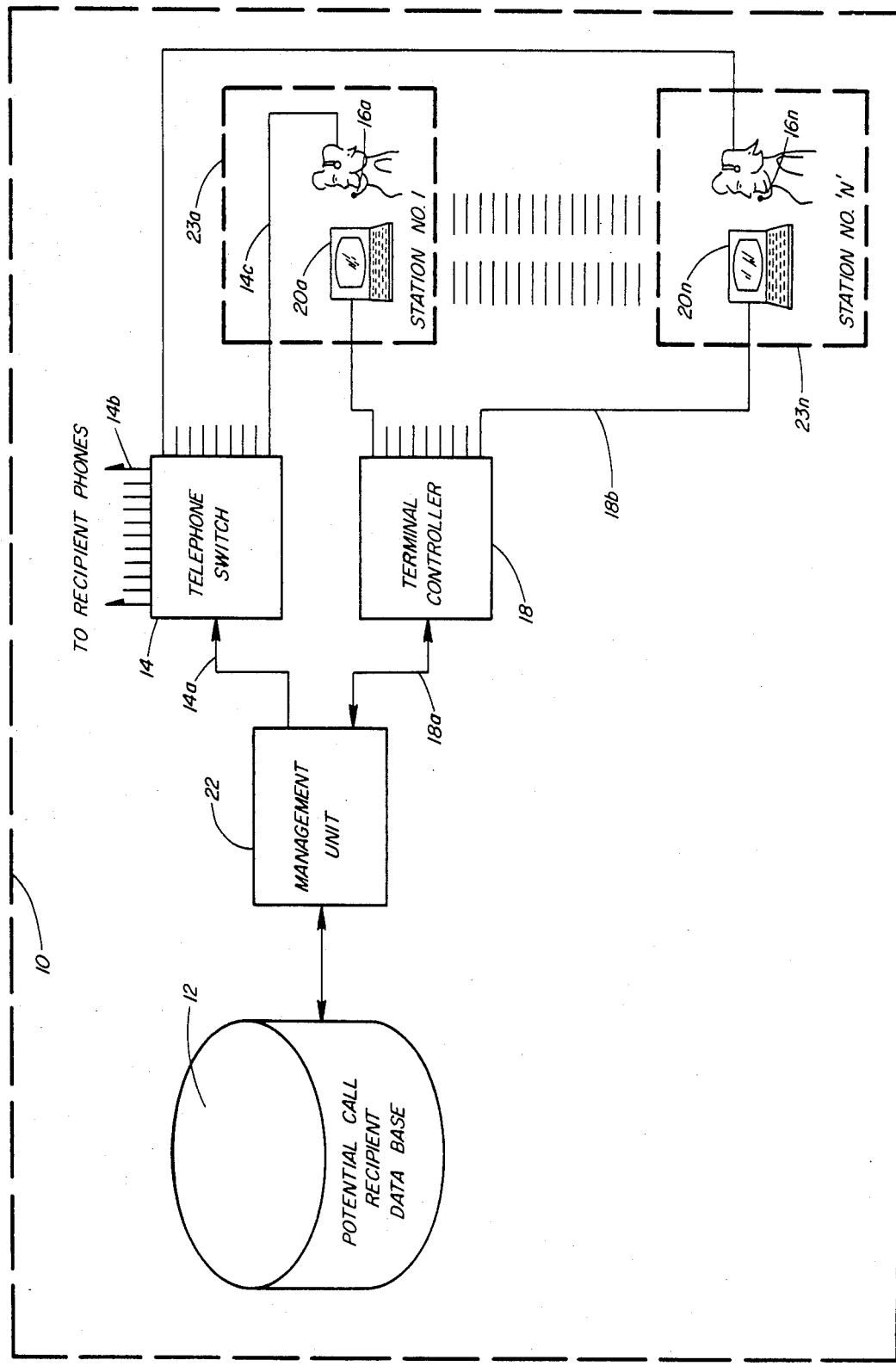
FIG. 1 is a simplified block diagram of the automated system for establishing telephone communication connections in accordance with the present invention.

Turning now to the drawings, in which identical or similar parts are designated by the same reference numerals throughout, and first referring to FIG. 1, the general overview of the system in accordance with the present invention is generally designated by the reference numeral 10. The system 10 includes a call recipient data base 12 and a telecommunications switching device such as a private branch exchange (PBX) telephone switch 14. The unit 14 may comprise any compatible conventional telephone switch such as the Bell System "Dimension TM" having conventional capabilities such as three way conferencing. The switch 14 has an input line 14a and output lines 14b and 14c. The output lines 14b are connected to the telephone trunk lines which emanate from the central telephone office and are ultimately connected to remote parties, call recipients' equipment or stations. The output lines 14c are connected to local extensions or stations 16n which are typically manned by local operators.

The switch 14 and a terminal controller 18 are connected to a management unit 22 by means of input lines 14a and 18a, respectively. The output lines 18b of the terminal controller 18 are connected to a bank of video display terminals 20n each associated with one of the local extensions or stations 16n, to form operational stations 23n with the respective equipment.

Figure 2:
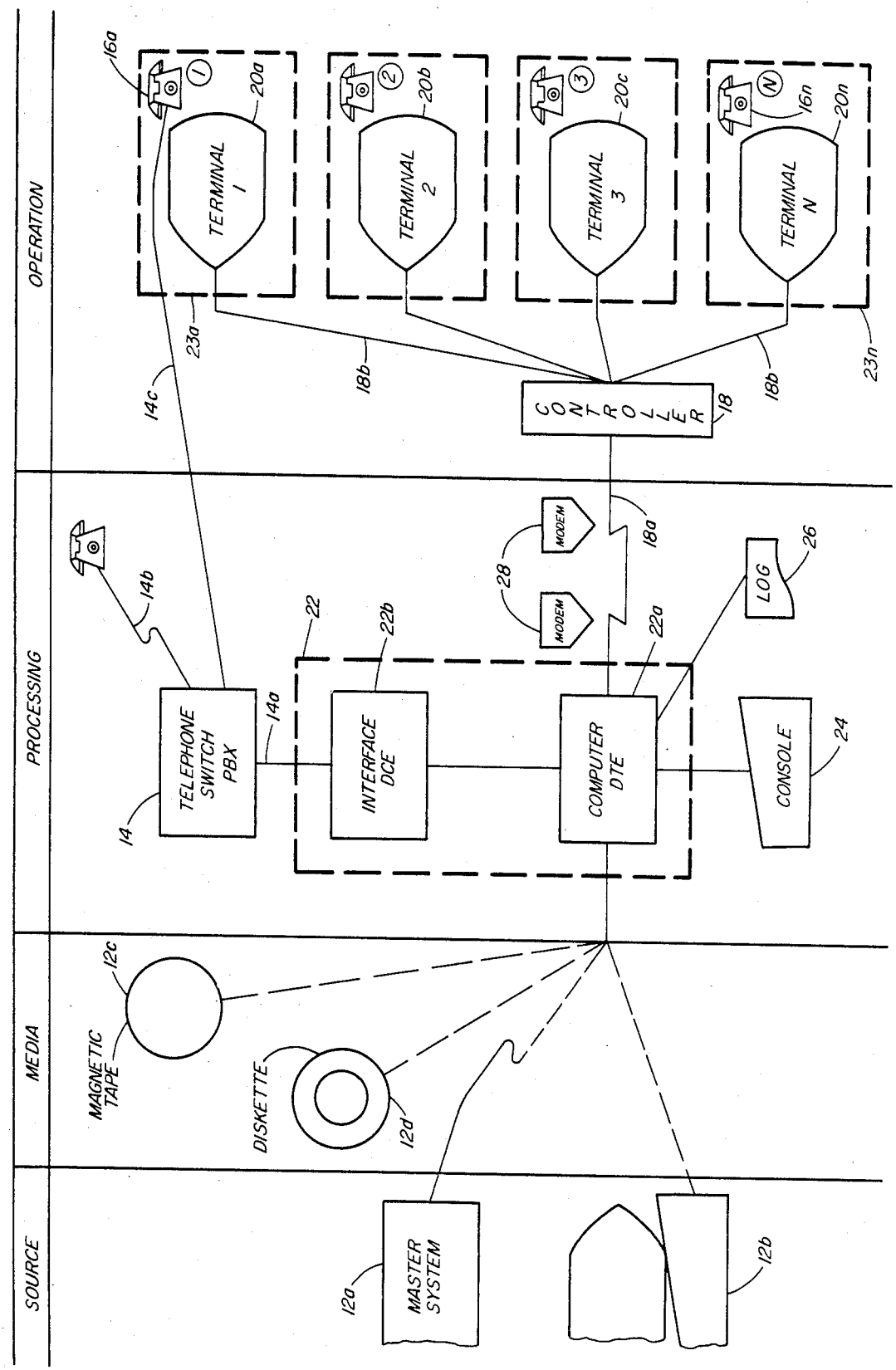
FIG. 2 is a block diagram illustrating in somewhat greater details the system shown in FIG. 1.

Referring to FIG. 2, the data base 12 could consist of a number of different sources or media. Thus, the data base 12 may be derived from a master system 12a, or a data terminal 12b, which may also be a visual display terminal 20n. The data base may also be stored on a magnetic tape 12c or a magnetic disk or diskette 12d. The data base of potential telephone call recipients may, in accordance with the invention, be on any compatible computer-readable medium. Thus, typical data bases which are contemplated for use in connection with the present invention include, by way of example, recent telephone numbers of customers which can typically be used for collections, prospects for telemarketing, donors for blood drives, contributors for fund raisers, voters for polls, consumers for solicitations, and the like.

The management unit 22 includes a processor 22a which may be a computer or data terminal equipment (DTE) which has an interface for outputting data to a telecommunications network by means of data communications equipment (DCE) 22b. Information stored in data base 12 is accessable to the computer 22a and the computer 22a processes the information to drive the telephone switch 14 through an interface unit or DCE 22b to be more further described below. Optional computer control devices, such as a console 24 and a log 26 may be used to interact with the computer 22a. The controller 18 is shown connected to the computer 22a through modems. Alternatively the controller 18 may be connected to the computer 22a by means of a local or direct interface.

The management unit 22 performs the functions of data acquisition and data processing under system and program controls, call equipment control, operator monitoring and response to data processing. With the system 10, multiple operators at operational stations 23n are each supported with continuous call-making and coordinated displays of related data. Operator activity is primarily focused on conversing with call recipients and entering the responses. Call making for each terminal is started and stopped by operator actions which can also be inputs to an audit trail.

Figure 3:
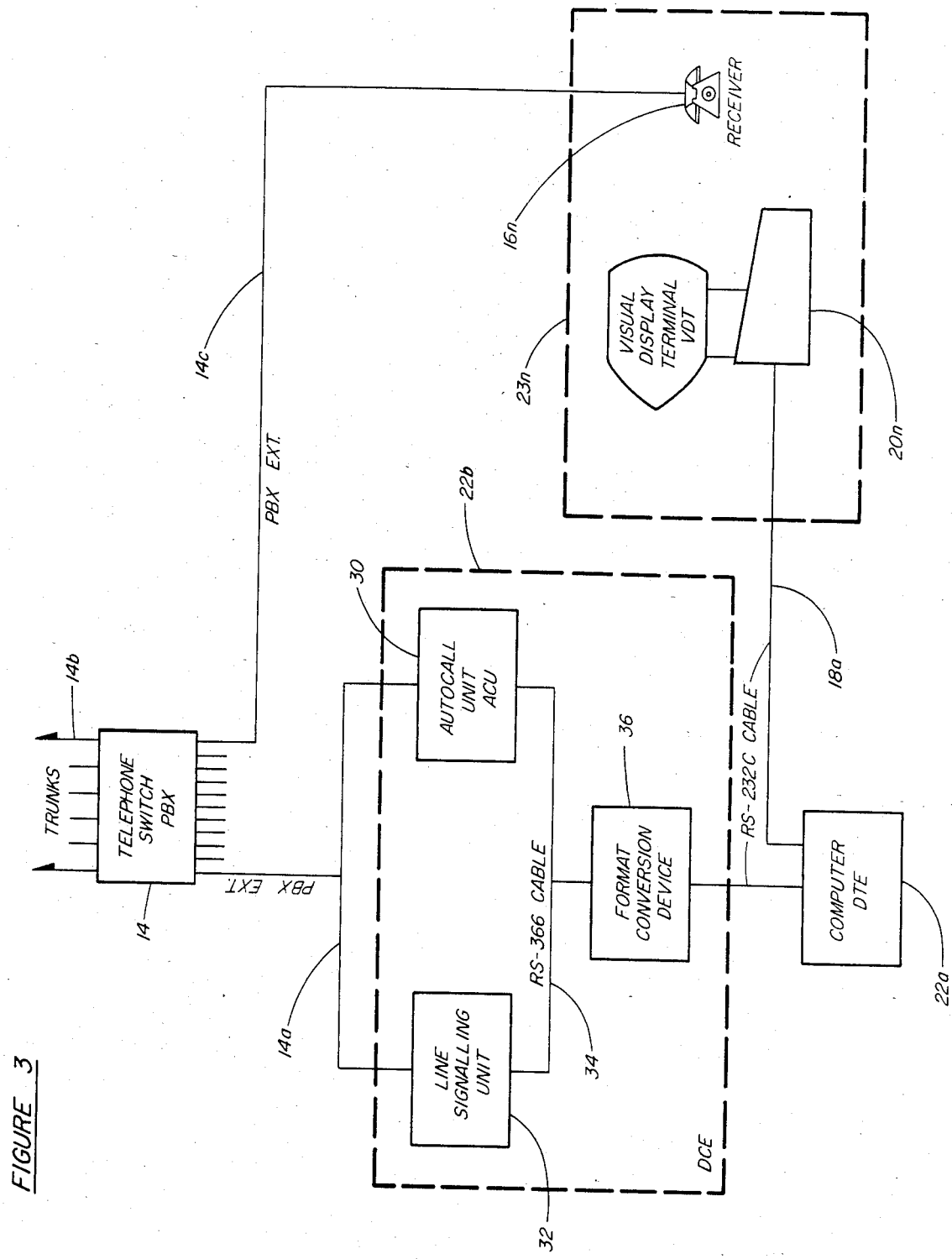
FIG. 3 is a block diagram of one embodiment of the system shown in FIG. 2, and also shows an alternative arrangement of interconnecting certain parts, apparatus or devices of the system.

Referring to FIG. 3, a specific embodiment of the data communications equipment (DCE) interface 22b is shown. The interface 22b is shown to include an autocall unit (ACU) or dialer 30 such as the Bell System data auxiliary set 801C. The interface 22b is also shown to include a line signalling unit 32 such as the Western Electric Part No. ED-5P040-30. The ACU 30 and the line signalling unit 32 are connected in parallel with the computer or data terminal equipment (DTE) 22a by means of a cable 34 such as the Western Electric Part No. 842990756. The ACU 30 and the line signalling unit 32 are connected in parallel to the telephone switch 14 by means of a cable 14a, which is Type 1 wire cable in a "Y" arrangement that plugs into either RJ-11, RJ-41 or RJ-45 Jacks whichever is appropriate for said telephone switch 14.

As will be described below, the present invention contemplates connection of the ACU 30 directly to the computer or data terminal equipment (DTE) 22a when the latter includes an EIA Standard RS-366 interface. However, where the computer or data terminal equipment (DTE) 22a outputs the information or data stream through an EIA Standard RS-232 interface, the invention contemplates the use of a format conversion device 36 which makes it possible for the computer or data terminal equipment (DTE) 22a, which generates serial ASCII data in accordance with the RS-232 interface specification, to drive or operate an RS-366 based ACU 30. As noted above, when the computer 22a is provided with a RS-366 interface, such as the IBM Series/1 which includes an autocall originate or teleprocessing card (IBM Part No. RPQ DO2013), the format conversion device 36 can be eliminated.

The system 10 establishes telephonic connections between successive groups of receivers or stations, each receiver of each group having an individual telephone address. For purposes of the present description, a "group" is defined to include at least two telephone receivers which may be proximate to each other or remote from each other and which are intended to be connected or conferenced together. The computer 22a under program control dynamically generates the telephone numbers of a group to be connected from stored data. In a typical application, a group consists of a local telephone receiver or an internal extension 16n of the telephone switch 14 and a remote telephone station connected by trunk lines through the telephone central office via the external lines 14b of the telephone switch 14. The telephone switch 14 is capable of receiving dialing information for dialing the receivers, whether remote or local, and also has conference connection capability which can connect at least two of the receivers within each group to each other upon the presentation of acceptable connection commands. The computer 22a has an interface capable, to be discussed below, for outputting the dialing information to the switch 14 and outputting connection commands in predetermined sequences. Under such arrangement, the computer 22a is the call originator and controls the telephone switch 14 to establish a communication connection between itself and a group of such telephone receivers. An important feature of the present invention is the ability of the computer 22a to disengage itself from the communication connection in progress while maintaining the voice connection between the receivers of said group. This feature allows the management unit 22 to generate information from stored data for the next group of receivers to be called and connected to each other and to proceed to set up the next telephone communication connection for this next group. This procedure continues until all of the desired telephone connections have been made.

Telephone Switch (PBX)

As noted above, the telephone switch 14 may be any conventional switch, such as PBX. Such switches normally accept dual tone multi-frequency or dial pulse information from a dialer and perform the connect function to connect the lines of the call originator and the dialed party. The line impedance transmission characteristics are typically 600 Ohms. An important property of such telephone switches, insofar as the present invention is concerned, is that they respond to a "hookswitch" flash which is characterized by a temporary lifting of the nominal line impedance of usually 600 Ohms to an open circuit. Most telephone switches can recognize a hookswitch flash as a three way conferencing or communication connection command. However, a hookswitch flash must be properly timed and must generally last only from 0.25 to 1.0 seconds. Flashing the hookswitch for less than the necessary time will not be sufficient for the PBX to recognize the conferencing or connection command. Opening the line for a period of more than the requisite time may be taken by the telephone switch as a hang-up or "on-hook" condition signalling the termination of a call. However, when the hookswitch flash is within the specified time constraints, and is initiated by a call originator after the establishment of a first connection, the switch 14 places a first call in progress on "hold" and prepares to accept a second call to a second telephone address. After the establishment of a second connection by the telephone switch 14, a second hookswitch flash initiated by the call originator instructs the switch 14 to lift the hold placed on a first call and to establish a three way communication connection. The two calls, one of which may be to an external receiver and the other one of which may be to an internal receiver of a local extention are then connected to each other. Under this arrangement, the call originator may disengage from such a communication connection by going "on hook" and the switch 14 will maintain the connection between the two parties called by the call originator.

In the case of the system 10 shown in FIGS. 1 and 2, management unit 22 automatically generates under program control a combination of at least two telephone numbers for a group from stored data. It engages the telephone switch 14 and dials the first number of the group. After a connection of the first call has been established by the switch 14, it generates a "hookswitch flash" to cause the switch 14 to place the first call in progress on hold as would occur if the "hookswitch flash" was performed manually. The second number of the group is then dialed through the switch 14. After a connection of the second call has been established, it generates a second "hookswitch flash" to cause the switch 14 to lift the hold on the first call and establish a three way communication connection. Again the connection or conferencing feature upon the occurance of the second "hookswitch flash" is conventional and would occur if the operation was performed manually with most conventional PBX switches. The management unit 22 subsequently disengages itself from the connection while the switch 14 maintains the connection between the lines of the first and second numbers called. The first number may be the telephone address for a telephone receiver of a call recipient through a trunk line 14b and the second telephone address may be that of a receiver of a local extension telephone station 16n. The remote telephone receiver is then connected to the local receiver 16n so that the operator manning a Station 23n can communicate by means of a telephone voice connection to the remote telephone recipient.

Visual Display Terminals

One feature of the invention is the provision of the system 10 to have a plurality of visual display terminals (VDT) 20n. The management unit 22 can synchronize or coordinate the sending of call recipient informational data to be displayed on the VDT's 20n by means of operating systems and application programs which are well known to those skilled in the art. The interconnect between the management unit 22 and the plurality of VDT's 20n can be through the terminal controller 18, as shown in FIG. 1 and FIG. 2, or can be through a direct interface as shown in FIG. 3. The interconnect may also be through means of modems 28, as shown in FIG. 2. Each VDT 20n in system 10 is provided with a local receiver 16n which is interconnected to the telephone switch 14. Under control of the management unit 22, telephonic communication connections are made between the local receivers 16n and the remote receivers of the call recipients and coordinated with informational displays on VDT's 20n so that operators are provided with means for reviewing and updating data regarding the call recipients while telephonically conversing with the call recipients.

When a telephone communication connection is made and the operator communicates with the call recipient, the operator can update the data displayed on the VDT 20n and the data base 12 can be corrected or updated. On the other hand, when a telephone communication connection is not possible, the operator can make a suitable entry on the VDT 20n to retry the call at a later time or day. The operator may then either permit the station 23n to be used for further call-making or to be logged off. The interactions of the computer 22a and the VDT's 20n are well known to those skilled in the art and conventional hardware and available software may be used.

Automatic Calling Unit (ACU)

The autocall unit (ACU) or dialer 30 is intended to accept dialing information in a formated data stream via its RS-366 interface and to convert it to a form acceptable to the telecommunications switch 14. Normally, such converted dialing information takes the form of dual tone multi-frequency or dial pulse signals acceptable to the switch 14.

One example of a dialer 30 is the data auxiliary set 801C which is described in Bell System Publication 41603, dated November 1976, published by the American Telegraph & Telephone Company. Because ACU 801C is described in detail in the aforementioned publication, the details will not be repeated here.

Dialing instructions, control commands and the telephone number of the receiver to be called are transmitted from the computer or data terminal equipment (DTE) 22a to the dialer or ACU 30 in the form of a data stream which is received by the ACU 30 in the form of parallel binary coded decimal (BCD) signals. The digits of the telephone number are received one at a time at the interface of the ACU 30, which in turn transmits each digit as dual tone multi-frequency or dial pulse signals to the telephone central office or to a PBX switch 14.

The ACU 30 interface conforms to the EIA Standard RS-366. The data stream outputted from the computer or data terminal equipment (DTE) 22a to the ACU 30 should conform to RS-366 protocol, or be converted to RS-366 protocol by a format conversion device 36 discussed below. The signals, interface mechanical characteristics and the functional description of the interchange circuits in accordance with the EIA Standard RS-366 are described, for example, in Publication EIA Standard RS-366-A (revision of RS-366) dated March 1979 and published by the Engineering Department of the Electronic Industries Association, Washington, D.C. 20006. The EIA Standard RS-366 protocol is well known to those skilled in the art and the details will not, therefore, be set forth here.

A brief summary of some aspects of EIA Standard RS-366 protocol which are germane to this invention are as follows.

When the computer or data terminal equipment (DTE) 22a commences making a call, a Call Request (CRQ) signal is issued. This is equivalent to a hand set "off-hook" condition during manual operation. The CRQ signal must be maintained "on" during a call origination and connecting process. The CRQ signal must be turned "off" before processing the next origination and connection process.

The digits of the telephone numbers to be called and connected contained in a data stream are transmitted to the ACU 30 on the Digit Signal Circuits NB1, NB2, NB4 and NB8, in parallel binary signals. The digits 0 to 9 use ten states of the Digit Signal Circuits, binary "0000" through "1001". Of the six remaining states, RS-366 protocol contemplates the use of four states for control commands of which the present invention operation requires the utilization of only the "SEP" state, binary "1101" which is used as a command to the ACU 30 to wait for dial tone. There are two unassigned states, binary "1110" and "1111". The ACU 30 ignores these two unassigned states. As will be shown below the present invention will use the binary "1111".

Line Signalling Unit

The line signalling unit 32, is connected to the computer or data terminal equipment (DTE) 22a in parallel with the autocall unit or dialer 30 by means of cable 34, such as the "Western Electric Cable 842990756. The line signalling unit 32 is connected to the telephone switch 14 in parallel with the autocall unit or dialer 30 by means of cable 14a, which is a Type 1 wire cable in a "Y" arrangement. This arrangement allows the line signalling unit 32 to simulate a hookswitch flash. As noted above, the ACU or dialer 30 input interface ignores the character "15" (binary signal "1111") which it considers to be an invalid signal. Line signalling unit 32, however, recognizes and responds to the character "15" (binary signal "1111"). When the character "15" signal is presented at the input to the signalling unit 32, it causes an internal relay to be actuated thereby simulating a momentary "on-hook" condition. This condition effectively lifts the 600 Ohm impedance on the circuitry to the switch 14. This momentary removal of the 600 Ohm line impedance is interpreted by the PBX switch 14 as a conferencing or connection command and an instruction to activate its conferencing or connection function.

Format Conversion Device

As noted above, when the computer or data terminal equipment (DTE) 22a has an EIA Standard RS-366 interface, it can be connected directly to the autocall unit or dialer 30 and the line signalling unit 32. However, many computers and data terminal equipment (DTE) have an EIA Standard RS-232 interface. In order to use such computers or data terminal equipment (DTE) to drive a RS-366 dialer or ACU 30 it is essential to first convert the format of the information from the EIA Standard RS-232 format to the EIA Standard RS-366 format. The present invention uses such a format conversion device 36 when the DTE 22a does not have a RS-366 interface. One such format conversion device 36 is the Racal-Vadic adapter Model No. VA 831A/B. This adapter is described in great detail in the Racal-Vadic "VA 831A/B Adapter", Installation/Operational Manual", Publication No. 18008-041/090, dated September 1980 and January 1981. The Racal-Vadic format conversion device is also described in U.S. Pat. No. 4,125,872, issued on Nov. 14, 1978.

The VA-831B adapter 36 is an EIA Standard RS-232C to EIA Standard RS-366 converter that allows data terminal equipment 22a to initiate automatic dialing through an EIA Standard RS-232C interface. Using the VA-831B adapter 36, the computer or DTE 22a with a RS-232 port may be interconnected with RS-366 data communication equipment (DCE) 22b to send dialing information and receive operating status indications. The format conversion device 36 receives dialing information on its RS-232 interface, stores and independently processes, converts and generates EIA Standard RS-366 protocol signals necessary to place a call through an automatic dialer 30. The VA-831B adapter 36 interfaces to an ACU 30, such as the Bell System 801C data auxiliary unit, and eliminates the need for a EIA Standard RS-366 compatible interface port at the computer or DTE 22a front end.

The VA-831B adapter 36 acts as a programmable peripheral that accepts and stores a data stream or character string which includes dialing instructions, control commands and telephone numbers from an EIA Standard RS-232C port of a DTE 22a. Once in receipt of the DTE's data stream or character string, the VA-831B adapter 36 independently controls the dialing and connecting interchange sequence of signals to a telephone switch 14 through an automatic dialer 30. The sequence of data received by the format conversion device 36 from the DTE 22a physically includes a Start of Text (STX) character, the telephone numbers of the receivers to be called and connected to each other, dialing instructions and control command characters, a Buffer Empty command character and an End of Text (ETX) character. The Start of Text (STX) character resets the format conversion device 36 into the "write" or receiving mode. The succeeding characters received are stored in its RAM buffer until an End of Text (ETX) character is received or the RAM overflows. The End of Text (ETX) character, when received, places the format conversion device 36 in the "read" or sending mode, initiating its interchange sequence with the ACU 30 and the line signalling unit 32. When the Buffer Empty command character is reached in the format conversion device 36 sequential transmission of said stored dialing information to the ACU 30 and the line signalling unit 32, it terminates its "read" or sending mode.

The characters of the telephone numbers to be called which are received and converted by the format conversion device 36 include the ASCII characters 0-9 which correspond to the original numeric telephone digits. The VA-831B adapter 36 also recognizes the character "12" (ASCII "<") and the character "13" (ASCII "=") as control characters. The ASCII "<" is treated as an end of a telephone number (EON) code. The ASCII "=" character serves as a tandem dial (TD) code. When the aforementioned ASCII "=" is included within the telephone number digits, the dial sequence at that point will be interrupted to await dial tone before dialing the remaining digits. This character is utilized in the present invention to access trunk and subscriber telephone systems. The character "13" (ASCII "=") is also utilized by the invention to await a dial tone before dialing the second telephone number in the character string after the switch 14 has placed the first number dialed on hold. The characters 10, 11, and 14 are not normally recognized as valid characters for processing by the VA-831B adapter 36, as it is presently configured.

As mentioned above in connection with line signalling unit 32, a control command generated by the computer or data terminal equipment (DTE) 22a must be transmitted through the format conversion device 36 to the line signalling unit 32 to cause the latter to generate a condition on its interface with the telephone switch 14 which will simulate a "Hookswitch Flash". Since the line signalling unit 32 recognizes the character "15", it is important for the format conversion device 36 to accept and to transmit this character. In order to permit the character "15" to be treated as a normal character in accordance with the RS-366 protocol a wiring change in the VA-831B is necessary. This change involves breaking contact of pin 2 of "M32" from the printed circuit board and connecting a jumper from pin 4 of "M29" to pin 2 of "M32". This modification enables the VA-831B to recognize and transmit character "15" (BCD signal "1111") as a normal character. This alteration also permits a change in the Buffer Empty command character normally recognized by the VA-831B adapter 36 as a "SI" character (BCD signal "1111") to a "SO" character (BCD signal "1110").

Operational Illustration

In the illustration described below, it will be assumed that the computer or data terminal equipment (DTE) 22a has an EIA Standard RS-232 interface so that a format conversion device 36, such as the Rascal-Vadic VA-831B converter must be used. The DTE 22a and the format conversion device 36 are connected by means of a RS-232C cable. The line signalling unit 32 in the illustration is the Bell System Line Signalling Unit Model No. ED-5P040-30. The ACU or dialer 30 in the example is the Bell System 801C data auxiliary set. The format conversion device 36 is connected to both the ACU 30 and the line signalling unit 32 by means of a cable 34 such as Western Electric Part No. 842990756. The telephone switch 14 in the example is a typical PBX such as the Bell Dimension TM or Horizon TM series. The telephone switch 14 is connected to the ACU 30 and the line signalling unit 32 by means of a cable 14a which is a Type 1 wire in a "Y" arrangement.

In this illustration the interface unit or data communications equipment (DCE) 22b includes: an ACU 30, a line signalling unit 32, a format conversion device 36 and a cable 34 which interconnects the ACU 30 and the line signalling unit 32 in parallel with the format conversion device 36.

The computer or data terminal equipment (DTE) 22a interfaces with the data communications equipment (DCE) 22b, via a RS-232 port, to output a serial data stream and receive operational status indications. Data streams are initiated and generated by the DTE 22a in accordance with the purpose and function of a program or programs and operating system common to the DTE 22a. The input/output (I/O) functions between the DTE 22a and the DCE 22b are typical and well known to those skilled in the art.

A typical serial data stream outputted by the DTE 22a in this example consists of:

A. A start control character, which is a HEX "02";
B. The digits, 0 to 9, which represent the first telephone number to be dialed;
C. A control character, which is a HEX "0F" and to which the line signalling unit 32 is responsive;
D. A control character, that signals the PBX 14 to return dial tone which is a HEX "0D";
E. The digits, 0 to 9, which represent the second telephone number to be dialed;
F. A control character, which is a HEX "0F" and to which the line signalling unit is responsive;
G. A control character, which when processed by the VA-831B will instruct it to clear its buffer, which is a HEX "0E"; and
H. A control character that indicates the end of the data stream, which is a HEX "03".

The above description represents the characters and their sequential order in a data stream which will function in a situation where the DCE 22b is connected to a PBX 14 via a cable 14a. The illustration assumes that operations do not require a code to gain dialing access to the PBX 14. It should be noted that the above example does not illustrate how the invention can readily access different trunk groups or subscriber systems such as WATS TM and/or MCI TM. It is anticipated that those skilled in the art can readily see how such can be accomplished through additional information in the data stream.

For the purposes of this illustration it will be further assumed that all system apparatus are in a state of readiness and are ready to function as designed.

When a data stream, as described above, is received by the format conversion device 36 the first control character, Item A, resets it into a "write" or receiving mode.

The buffer of the format conversion device 36 accepts and stores the succeeding characters of the said data stream until the end control character, Item H in the above example, is detected.

At that point the format conversion device 36 is placed in a "read" or sendng mode initiating the interchange with the ACU 30 by issuing a call request (CRQ) signal. The CRQ signal is maintained during the entire interchange with the ACU 30.

The ACU 30 in response to the CRQ signal requests a line from the PBX 14. Upon successful completion the ACU 30 issues a present next digit (PND) signal to the format conversion device 36.

Upon detection of the PND signal, the format conversion device 36 commences converting the digits of the first telephone number to be dialed, Item B above, into data acceptable for interacting with the ACU 30 per RS-366 requirements. When the first digit is converted and set on the digit signal circuits, NB1, NB2, NB4 and NB8, the format conversion device 36 issues a digit present (DPR) signal to the ACU 30.

The ACU 30 in response to the DPR signal accepts and dials the digit.

The exchange between the format conversion device 36 and the ACU 30 continues under RS-366 protocol until the first telephone number has been dialed. After the last digit of the telephone number has been dialed the ACU 30 continues to issue a PND signal.

The format conversion device 36 next processes the character "15" (HEX "0F"), Item C above. This signal is ignored by the ACU 30, but causes the line signalling unit 32 to remove the nominal 600 Ohm line impedance for more than 250 and not more than 1000 milliseconds.

The removal of the line impedance for this time constraint is interpreted by the PBX 14 as a request to place the telephone number just dialed on hold.

The format conversion device 36 next processes Item D of the above example data stream. This signal issued to the ACU 30 requests the PBX 14 to return dial tone.

When the dial tone is present the ACU 30 issues a PND signal to the format conversion device 36 initiating the process of dialing the second telephone number contained in Item E of the data stream. This is processed in the same manner as described above for the processing of Item B.

Upon completion of dialing the second telephone number and the detection of a PND signal, the format conversion device 36 processes Item F. The processing and the effect of this issued signal is the same as it was described for Item C above, however, the PBX 14 now interprets the removal of the 600 Ohm line impedance as a command to connect the first telephone number called which was placed on hold with the second telephone number which was just dialed thereby establishing a three way communication connection.

The format conversion device 36 next processes Item G, a "buffer empty" control character, which terminates its "read" or sending mode, clears the buffer and resets the buffer counter to zero.

At this point and in this illustration the ACR timer in the ACU 30 is permitted to time out, which initiates an ACR signal. Upon detection of the ACR signal, the format conversion device 36 sends an operational status signal, a "B" character, to the DTE 22a which indicates that another data stream can be processed.

At this point the CRQ has been dropped, all leads and pins have been reset and the line between the DCE 22b and the PBX 14 is in a "on-hook" state.

It is important that the next data stream not be initiated for approximately 1.75 seconds, since premature processing of the next data stream by the DCE 22b, may cause the PBX 14 to attempt to reconnect the DTE 22a to the connection that had been just established, thus interrupting that connection.

It will be appreciated by those skilled in the art how the above described operation can be used for the purpose of establishing telephonic communication connections. It can be also readily appreciated that under the control of a computer or data terminal equipment (DTE) the above operation can be synchronized and coordinated with other operations such as those providing information for display at visual display terminals 20n. Such a combined operation can use stored data for informational and communication purposes to service both a plurality of visual display terminals and a plurality of telephone receivers, where each visual display terminal 20n is associated with a telephone receiver 16n to form an operational communication station 23n manned by an operator or communicator.

Several applications for an automated system for establishing telephone connections using stored data have already been illustrated above. These, of course, are only a few examples and numerous other data bases and uses are possible for this versatile and flexible system.

While the invention has been particularly shown and described with reference to a preferred embodiment thereof, it will be understood by those skilled in the art that the foregoing and other changes in form and details may be made therein without departing from the spirit and scope of the invention. Thus, while the system described has utilized a PBX telephone switch 14, it is also possible to use this invention through a central office switch (CENTREX TM) through suitable arrangements with the telephone company, as well as with other dialing schemes. Also, while the hookswitch flasher has been disclosed to comprise a line signalling unit 32 manufactured by the Bell System it should be also clear that the use of this unit is not critical and that any other suitable device which serves to temporarily remove the 600 Ohm line impedance from the circuit to the PBX 14 upon the presentation of a command control character "15" can also be used. The same holds true for the VA-831B adapter. Clearly, any suitable format conversion device which converts a serial stream of data from the EIA Standard RS-232 to the EIA Standard RS-366 protocols, and which accommodates the command control character "15" can also be used. Of course, as noted, when the computer or data terminal equipment itself has a EIA Standard RS-366 interface then the format conversion device 36 can be totally eliminated. This would be true, for example, if the computer 22a is the IBM Series/1 provided with the autocall originate teleprocessing card RPQ DO2013.

What is claimed is:

1. A machine controlled automated outgoing calling system for originating and controlling telephonic communication connections, in a high speed, repetitive manner and which can service a plurality of receivers each having a telephone number, comprising:

a. telephone switching means for receiving dialing signals from a machine call originator for the purpose of dialing a plurality of receivers and establishing connections between the dialed receivers; and for receiving control command signals for the purpose of establishing telephonic communication connections;

b. computer or data terminal equipment (DTE) means, serving as a call originator, for accessing stored data which includes telephone numbers of said plurlity of receivers to be called and creating, from said stored data, combinations of at least two receivers to be called for the purposes of automatically connecting said receivers of said combinations, and for creating a data stream which is a string of characters in a predetermined format for each said combination of receivers to be connected which represents the telephone numbers of the receivers and control commands for the the purposes of engaging said telephone switching means, dialing the telephone numbers of one combination of receivers, connecting said one combination of receivers to each other and disengaging from said switching means to permit the next connection of another combination of receivers to be initiated automatically for outputting said data stream; and for receiving operational information indicating when the next said data stream can be automatically outputted; and c. telecommunication (DCE) means including;
means for receiving said data stream from the DTE means;
means for processing and converting said data stream to said dialing signals and said control command signals for the purposes of engaging said telephone switching means and dialing said receivers and connecting at least two said receivers together and disengaging from said telephone switching means;
first operational means for transmitting said dialing signals and said control command signals to said telephone switching means; and
second operational means for transmitting operational information to said DTE means including an indication when the next data stream for the next connection of another combination of said receivers can be automatically serviced.

2. A machine controlled automated outgoing calling system according to claim 1, wherein said data stream from said DTE means is in a special predetermined format, and wherein said DCE means further comprises means for receiving and storing said data stream from said DTE means.

3. A machine controlled automated outgoing calling system according to claim 2, wherein said data stream is processed by said DCE means in accordance with the EIA RS-366 Standard.

4. A machine controlled automated outgoing calling system according to claim 1, wherein said telephone switching means initiates a telephonic communication connection function upon detection of the first occurrence of a control command signal, a hookswitch flash, an impedance level change, on an engaged line between said DCE means and said telephone switching means and establishes a telephonic communication connection upon detection of the second occurrence of a control command signal, hookswitch flash, an impedance level change on the engaged line between said DCE means and said telephone switching means, wherein said means for processing and converting and first operational means of said DCE means comprise line signalling means for receiving a unique control command contained in said data stream created by said DTE means and transmitted to said DCE means which said DCE means processes and converts separately from all other characters in said data stream, and responding to said unique control command which electronically causes a timed removal of impedance at the point of its connection between said DCE means and said telephone switching means, thereby simulating a hookswitch flash that said telephone switching means will interpret as said control command signal for establishing telephonic communication connections.

5. A machine controlled automated outgoing calling system according to claim 1, further comprising means for interconnecting a plurality of automated operational stations each comprising video display terminal (VDT) means for visually exhibiting reference information and which is interconnected with said DTE means, and associated telephone receiver means for voice telephonic communications which is interconnected with said telephone switching means.

6. A machine controlled automated outgoing calling system according to claim 5, further comprising means for interconnecting said VDT means with said DTE means whereby each of said VDT means is managed under operating systems and application programs control of said DTE means, wherein each said VDT means has a unique address for the purposes of communication with said DTE means and each said telephone receiver means associated with each said VDT means has an individual telephone number or address for the purpose of permitting said DTE means to establish telephonic communication with each of said telephone receiver means through said DCE means and said telephone switching means.

7. A machine controlled automated outgoing calling system according to claim 6, wherein said DTE means includes means for accessing stored data containing information regarding call recipients including telephone numbers of receivers where said call recipients can be contacted and reference information pertinent to the reason for the call and for each call recipient accessed generating two data streams, one of which contains the telephone number of said call recipient for transmission to said DCE means, and the other one of which contains reference information of said call recipient for transmission to an associated VDT means.

8. A machine controlled automated outgoing calling system according to claim 7, wherein said DTE means includes means for storing data containing the addresses of each said telephone receiver means and each said VDT means associated with each other and comprising an automated operational station for the purpose of coordinating and synchronizing said DTE means communication with each said automated operational station.

9. A machine controlled automated outgoing calling system according to claim 8, wherein each one of said automated operational stations include means for an operator manning said automated operational station to electronically signal said DTE means from said VDT means to initiate and manage automated telephonic communications with call recipients contained in the stored data of said DTE means.

10. A machine controlled automated outgoing calling system according to claim 1, wherein said first operational means of said DCE means comprises an automatic dialer (ACU) means.

11. A machine controlled automated outgoing calling system according to claim 10, wherein said DCE means further comprises line signalling means for responding to a unique control command by electronically causing an impedance level change at its point of connection with said telephone switching means upon receiving said unique control command from said DTE means.

12. A machine controlled automated outgoing calling system according to claim 11, wherein said ACU means and said line signalling means are connected in parallel to each other between said telephone switching means and said DTE means.

13. A machine controlled automated outgoing calling system according to claim 12, further comprising an interconnection means arranged in a parallel configuration for connecting said ACU means and line signalling means to said DTE means.

14. A machine controlled automated outgoing calling system according to claim 12, further comprising dialing and control command signal transmitting interconnection means arranged in a parallel configuration for connecting said ACU means and line signalling means to said telephone switching means.

15. An automatic outgoing calling method for originating and controlling telephonic communication connections, in a high speed, repetitive manner and which can service a plurality of receivers each having a telephone number, comprising the steps of:
   a. receiving by a telephone switch dialing signals from a call originator for the purpose of dialing a plurality of receivers and establishing connections between the dialed receivers and receiving control command signals for the purpose of establishing telephonic communication connections;
   b. accessing stored data, by a computer or data terminal equipment (DTE) serving as a call originator, which data includes telephone numbers of said plurality of receivers to be called and creating from said stored data, combinations of at least two receivers to be called for the purposes of automatically connecting said receivers of said combinations;
   c. creating by the DTE a data stream which is a string of characters in a predetermined format for each said combination of receivers to be connected which includes the telephone numbers of the receivers and control commands for the purpose of engaging the telephone switch, dialing said telephone numbers of one combination of receivers, connecting said one combination of receivers to each other and disengaging the telephone switch to permit the next connection of another combination of receivers to be initiated automatically;
   d. outputting said data stream by the DTE;
   e. receiving operational information by the DTE which indicates when the next data stream can be automatically outputted;
   f. receiving by telecommunication equipment (DCE) said data stream from the DTE;
   g. processing and converting by the DCE said data stream to said dialing signals and said control command signals for the purposes of engaging the telephone switch and dialing of the receivers and connecting at least two said receivers to each other and disengaging from the telephone switch;
   h. firstly transmitting by the DCE said dialing and control command signals to the telephone switch; and
   i. secondly transmitting by the DCE operational information to the DTE including an indication when the next connection of another combination of said receivers can be automatically serviced.

16. A method according to claim 15, wherein the data stream from the DTE is in a predetermined format, and further comprising the step of receiving and storing said data stream from the DTE.

17. A method according to claim 16, wherein said data stream is converted into a format which complies with EIA RS-366 Standard.

18. A method according to claim 15, wherein the telephone switch initiates a telephonic communication connection function upon detection of the first occurrence of a control command signal, a hookswitch flash, an impedance level change on an engaged line between the DCE and the telephone switch and establishes said telephonic communication connection upon detection of the second occurrence of a control command signal, hookswitch flash, an impedance level change on the engaged line between the DCE and the telephone switch, wherein said processing, converting and first transmitting comprise the steps of receiving a unique control command contained in said data stream created by the DTE and transmitted to the DCE, processing and converting by the DCE separately from all other characters in said data stream, responding to said unique control command which electronically causes a timed removal of impedance at the point of its connection between the DCE and the telephone switch, thereby simulating a hookswitch flash that the telephone switch will interpret as a control command signal for the purpose of establishing said telephonic communication connection, and timing the duration of said removal of impedance so that the telephone switch will interpret said impedance level change as a hookswitch flash.

19. A method according to claim 15, further comprising the step of interconnecting each of a plurality of automated operational stations, each of which comprises a visual display terminal (VDT), for servicing reference information and an associated telephone receiver, for servicing telephonic communication, with the DTE and telephone switch.

20. A method according to claim 19, further comprising the steps of interconnecting operational stations with the DTE and managing the operational stations under operating system and application program controls of the DTE.

21. A method according to claim 15, wherein the telephone switch provides line status signals and wherein the step of processing and converting includes the steps of:
   outputting said dialing signals and said control command signals, as converted from said data stream, to the telephone switch and supervising the interaction with the telephone switch to automatically dial and connect the combination of receivers;
   interacting with the telephone switch wherein said control command signals include control commands which are capable of engaging and disengaging the telephone switch; and
   responding to line status signals of the telephone switch that either indicate a state of readiness to respond when said dialing signals and said control command signals can be acted upon or indicate conditions that would inhibit response to said dialing signals and control command signals.

22. A method according to claim 15, wherein the step of secondly transmitting comprises the steps of:

communicating to the DTE when detection of a signal from the telephone switch indicates a condition that would inhibit the connection in process for said data stream; and communicating to the DTE when said data stream has been completely processed and is ready to service the next data stream.

23. A method according to claim 20, wherein said managing step comprises: initiating and processing an operational cycle in which the DTE accesses stored data to select appropriate information; generating a first data stream consisting of a selected telephone number of an intended call recipient and a telephone number of a receiver of one of said operational stations and said control commands; outputting said first data stream to the DCE and supervising the interaction between the DCE and the telephone switch; generating a second data stream from selected information containing reference information of said intended call recipient for the purpose of exhibiting said reference information visually on a visual display terminal (VDT) of said one of said operational stations; and outputting said second data stream to the said VDT of said one of said operational stations and supervising the interaction between the DTE and said VDT.

24. A method according to claim 23, further comprising the step of synchronizing said steps of outputting said first data stream and said second data stream respectively outputted to the DCE and to said VDT, whereby the visual reference information exhibited on said VDT of said one of said operational stations corresponds to the telephone receiver which is dialed by the DCE.

25. A method according to claim 15, further comprising the step of interconnecting an autocall unit and a line signalling unit in parallel arrangement between the DTE and the telephone switch for performing the functions of said steps of receiving, processing, converting and first transmitting.

* * * * *